United States Patent
Penazzi

(10) Patent No.: US 11,241,808 B2
(45) Date of Patent: *Feb. 8, 2022

(54) FEMALE MOULD

(71) Applicant: SACMI COOPERATIVA MECCANICI IMOLA SOCIETA' COOPERATIVA, Imola (IT)

(72) Inventor: Davide Penazzi, Imola (IT)

(73) Assignee: SACMI COOPERATIVA MECCANICI IMOLA SOCIETA' COOPERATIVA, Imola (IT)

(*) Notice: Subject to any disclaimer, the term of this patent is extended or adjusted under 35 U.S.C. 154(b) by 0 days.

This patent is subject to a terminal disclaimer.

(21) Appl. No.: 16/085,381

(22) PCT Filed: Mar. 15, 2017

(86) PCT No.: PCT/IB2017/051503
§ 371 (c)(1),
(2) Date: Sep. 14, 2018

(87) PCT Pub. No.: WO2017/158530
PCT Pub. Date: Sep. 21, 2017

(65) Prior Publication Data
US 2019/0084190 A1      Mar. 21, 2019

(30) Foreign Application Priority Data

Mar. 15, 2016   (IT) .................. 102016000026937

(51) Int. Cl.
*B29C 33/04*       (2006.01)
*B29C 43/42*       (2006.01)
(Continued)

(52) U.S. Cl.
CPC .............. *B29C 33/04* (2013.01); *B29C 43/42* (2013.01); *B29C 43/52* (2013.01); *B29L 2031/565* (2013.01)

(58) Field of Classification Search
CPC .......... B29C 33/04; B29C 43/42; B29C 43/52
See application file for complete search history.

(56) References Cited

U.S. PATENT DOCUMENTS 4,265,852 A * 5/1981 Sauer .................... B29C 43/146
264/512
5,786,079 A    7/1998 Alieri
(Continued)

FOREIGN PATENT DOCUMENTS

CN          1359324 A      7/2002
EP          0730520 A1     9/1996
(Continued)

*Primary Examiner* — Yung-Sheng M Tsui
(74) *Attorney, Agent, or Firm* — Pearne & Gordon LLP

(57) ABSTRACT

A female mould having a forming cavity inside which a concave object can be formed, comprises:
  an annular forming element extending about an axis and delimiting the forming cavity about said axis;
  a plate element which delimits the forming cavity transversely to said axis, the plate element having a reference surface extending transversely to said axis externally of the forming cavity;
  a peripheral annular component at least partially surrounding the annular forming element.
The annular forming element abuts against a first portion of the reference surface of the plate element. The peripheral annular component abuts against a second portion of the reference surface of the plate element.

22 Claims, 8 Drawing Sheets

(51) Int. Cl.
*B29C 43/52* (2006.01)
*B29L 31/56* (2006.01)

(56) References Cited

U.S. PATENT DOCUMENTS

| | | | |
|---|---|---|---|
| 6,390,800 B1 * | 5/2002 | Brown | B29C 45/262 249/59 |
| 6,585,508 B1 | 7/2003 | Zuffa | |
| 7,934,920 B2 | 5/2011 | Rote et al. | |
| 8,469,695 B2 | 6/2013 | Rote et al. | |
| 2004/0180107 A1 * | 9/2004 | Zuffa | B29C 43/42 425/437 |
| 2006/0286190 A1 | 12/2006 | Rote et al. | |

FOREIGN PATENT DOCUMENTS

| | | |
|---|---|---|
| EP | 1278621 A1 | 1/2003 |
| JP | H01280516 A | 11/1989 |
| JP | 2008074110 | 4/2008 |
| JP | 2012056325 A | 3/2012 |
| TW | 200413161 A | 8/2004 |

\* cited by examiner

FEMALE MOULD

FIELD OF THE INVENTION

The invention relates to a female mould suitable for co-operating with a male mould in order to obtain a concave object, particularly a cap of a container. The female mould according to the invention is particularly suitable for being used in compression moulding objects made of polymeric material.

DESCRIPTION OF RELATED ART

In the machines intended to produce caps by compression moulding, it is known to use a female mould provided with a forming cavity inside which a male mould element can be received. The male mould element is suitable for interacting with the female mould in order to obtain the cap. The known female mould comprises a plate, which delimits a bottom surface of the forming cavity, and an annular forming element, which delimits a lateral surface of the forming cavity. The known female mould further comprises a ring, which is arranged externally of the plate and of the annular forming element. Between the plate, the annular forming element and the ring a cooling circuit is defined. In the cooling circuit, a cooling fluid may flow for thermally conditioning the forming cavity. The annular forming element abuts against the plate, which in turn abuts against a base of the female mould. The base further supports the ring, but the ring may be not directly in contact with the base, because a gasket may be interposed between the base and the ring.

The annular forming element is provided with a protruding portion which projects radially outwards along the entire upper perimeter of the annular forming element.

A locking nut is screwed on a component that is fixed relative to a stem of an actuator, the actuator being arranged for moving the female mould relative to the male mould element. The locking nut abuts against the protruding portion of the annular forming element, thereby exerting a clamping force which pushes the annular forming element against the plate. Due to the force exerted by the locking nut, the plate is in turn pushed against the base of the female mould.

On an upper surface thereof, the annular forming element is further provided with a circumferential projection which is suitable for being received in a corresponding seat made on a component which is associated to the male mould element. The circumferential projection and the corresponding seat allow the female mould to be centered with respect to a male mould in which the male mould element is embedded. The plate is provided, on a lower surface thereof, with a plurality of channels, for example radial channels, which open on a lateral surface of the plate. The lateral surface is interposed between a lower face and an upper face of the plate. The channels are in fluid communication with an axial interspace defined between the annular forming element and the ring. The axial interspace extends axially, so as to surround the forming cavity parallel to an axis of said cavity.

In addition to being radially spaced from the ring, thus defining the axial interspace, the annular forming element may be not in contact with the ring even in the axial direction. In other words, the annular forming element is separated from the ring by a pre-established axial clearance, i.e. by a pre-established distance measured parallelly to the axis of the forming cavity. This axial clearance is due to the fact that the components of the female mould may have axial dimensions which deviate from the theoretical values, for example due to machining errors. Owing to the axial clearance defined between the annular forming element and the ring, any deviations of the axial dimensions of the components of the female mould from the theoretical values may be compensated.

A cooling fluid, fed near a central zone of the bottom surface of the plate, may flow outwardly along the channels of the plate, and then flow upwards in the axial interspace defined between the annular forming element and the ring. From here, the cooling fluid flows into a transverse passage defined between the ring and the annular forming element, in order to move away from the forming cavity.

The cooling fluid can thus cool the cap that is shaped in the forming cavity. A drawback of the female mould described above is that, when the locking nut is tightened on the component that is fixed relative to the stem of the actuator, the protruding portion of the annular forming element acts as a cantilever and may flex downwards, i.e. towards the stem of the actuator. This may result in a deformation of the circumferential projection arranged on the upper surface of the annular forming element. If this occurs, the accuracy with which the female mould is centered with respect to the male mould may be jeopardized.

Furthermore, in the event that the locking nut is tightened incorrectly on the component on which the locking nut is to be screwed, in particular by applying excessive torque, the protruding portion of the annular forming element may, in the worst cases, deform until it breaks.

A further drawback of the known female mould is that cooling of the cap which is about to be produced in the forming cavity is performed with a non-optimal cooling effectiveness. In particular, in order that the protruding portion of the annular forming element is not excessively stressed, it is desirable that the axial clearance does not exceed a limit value. A conformation of the protruding portion suitable for improving the cooling process, may cause a deformation which could lead to breakage of the annular forming element. Consequently, the cooling fluid flowing in the female mould is not able to arrive very close to the upper surface of the annular forming element. This implies that the regions of the cap which are formed near the upper surface cannot be suitably cooled in short times. It may therefore be necessary to maintain the cap in the forming cavity for a relatively long time, which determines an increase of the cycle time and a consequent reduction in productivity.

An object of the invention is to improve the female moulds for forming concave objects, such as caps for containers, particularly by compression moulding measured amounts or doses of polymeric material.

Another object is to reduce the risk that the components of the female mould may deform or even break during the assembly operations for assembling the female mould on an apparatus intended to produce concave objects.

Still another object is to increase the precision with which the female mould can be centered with respect to a male mould, the male mould co-operating with the female mould for obtaining moulded objects.

A further object is to increase the efficiency with which a cooling fluid that circulates inside the female mould, thermally conditions an object that is about to be formed, thereby decreasing the cycle time and increasing productivity.

SUMMARY OF THE INVENTION

According to the invention, there is provided a female mould having a forming cavity inside which a concave object can be formed, the female mould comprising:
- an annular forming element extending about an axis and delimiting the forming cavity about said axis;
- a plate element which delimits the forming cavity transversely to said axis, the plate element having a reference surface extending transversely to said axis outside the forming cavity;
- a peripheral annular component at least partially surrounding the annular forming element, wherein the annular forming element abuts against a first portion of the reference surface of the plate element,
and wherein the peripheral annular component abuts against a second portion of the reference surface of the plate element.

Owing to the invention, the accuracy with which the female mould components are assembled may be increased. Indeed, the plate element acts as a reference for positioning both the annular forming element and the peripheral annular component. It is thus possible to eliminate, or at least significantly reduce, inaccuracies which inevitably would occur if the annular forming element and the peripheral annular component were assembled by placing the annular forming element and the peripheral annular component in abutment against distinct pieces.

Owing to the improved precision which may be achieved with the annular forming element and the peripheral annular component abutting against the same reference surface, it is no longer necessary to adopt great axial clearances for compensating possible machining or assembling errors.

In particular, for correctly positioning the female mould with respect to a male mould co-operating therewith, there may be provided a centering member which is axially rigid relative the plate element. In other words, it is possible to avoid any axial clearance between the centering member and the plate element. Significant deformations of the centering member are thus prevented when the annular forming element and the peripheral annular component are made fixed relative to the plate element for assembling the female mould. The centering member is therefore able to correctly center the female mould with respect to the male mould.

Furthermore, it is possible to reduce the risks of breaking the annular forming element and/or the peripheral annular component when the annular forming element and the peripheral annular component are tightened against the plate element.

The female mould according to the invention can be cooled more effectively than the female moulds of the prior art. Owing to the absence of significant axial clearances between the annular forming element and the peripheral annular component, cooling conduits may be provided in a position which is relatively distant form the plate element, in an axial direction. This allows the zones of the forming cavity which are arranged farthest from the plate element, i.e. closer to the male mould, to be more effectively cooled.

In an embodiment, the peripheral annular component is clamped between the annular forming element and the plate element.

In particular, the peripheral annular component is clamped between the plate element and a radially projecting portion of the annular forming element.

In an embodiment, a centering member is provided for centering the female mould with respect to the male mould, the centering member being particularly shaped as a circumferential projection.

The centering member may be obtained on the annular forming element. In an embodiment, the female mould comprises a blocking ring suitable for pushing on a blocking surface for fastening the annular forming element and the peripheral annular component against the plate element.

The blocking surface may be obtained on the annular forming element, particularly on a peripheral appendage of the annular forming element.

A female mould having a particularly simple and reliable structure is thus obtained.

In a further embodiment, the annular forming element has a portion interposed between the plate element and the peripheral annular component. The centering member may be formed on the peripheral annular component, on which the blocking surface may also be made. The blocking ring engages with the above mentioned blocking surface.

In this case, the peripheral annular component therefore has multiple functions, namely correctly positioning the annular forming element with respect to the plate element, allowing the female mould to be centered with respect to the male mould, and engaging with the blocking ring. The annular forming element has on the other hand a single predominant function, namely the function of laterally delimiting the forming cavity. The annular forming element may therefore have a reduced thickness in a radial direction, which is sufficient to ensure that the annular forming element has an acceptable stiffness level.

By providing a relatively thin annular forming element, a cooling fluid that passes in a space defined between the annular forming element and the peripheral annular component, may flow very close to the moulding cavity. This allows the forming cavity to be cooled in an extremely efficient manner.

BRIEF DESCRIPTION OF THE DRAWINGS

The invention will be better understood and carried out with reference to the appended drawings, which show as an example some non-limiting embodiments thereof, in which.

DETAILED DESCRIPTION OF PREFERRED EMBODIMENTS OF THE INVENTION

Figure 1:
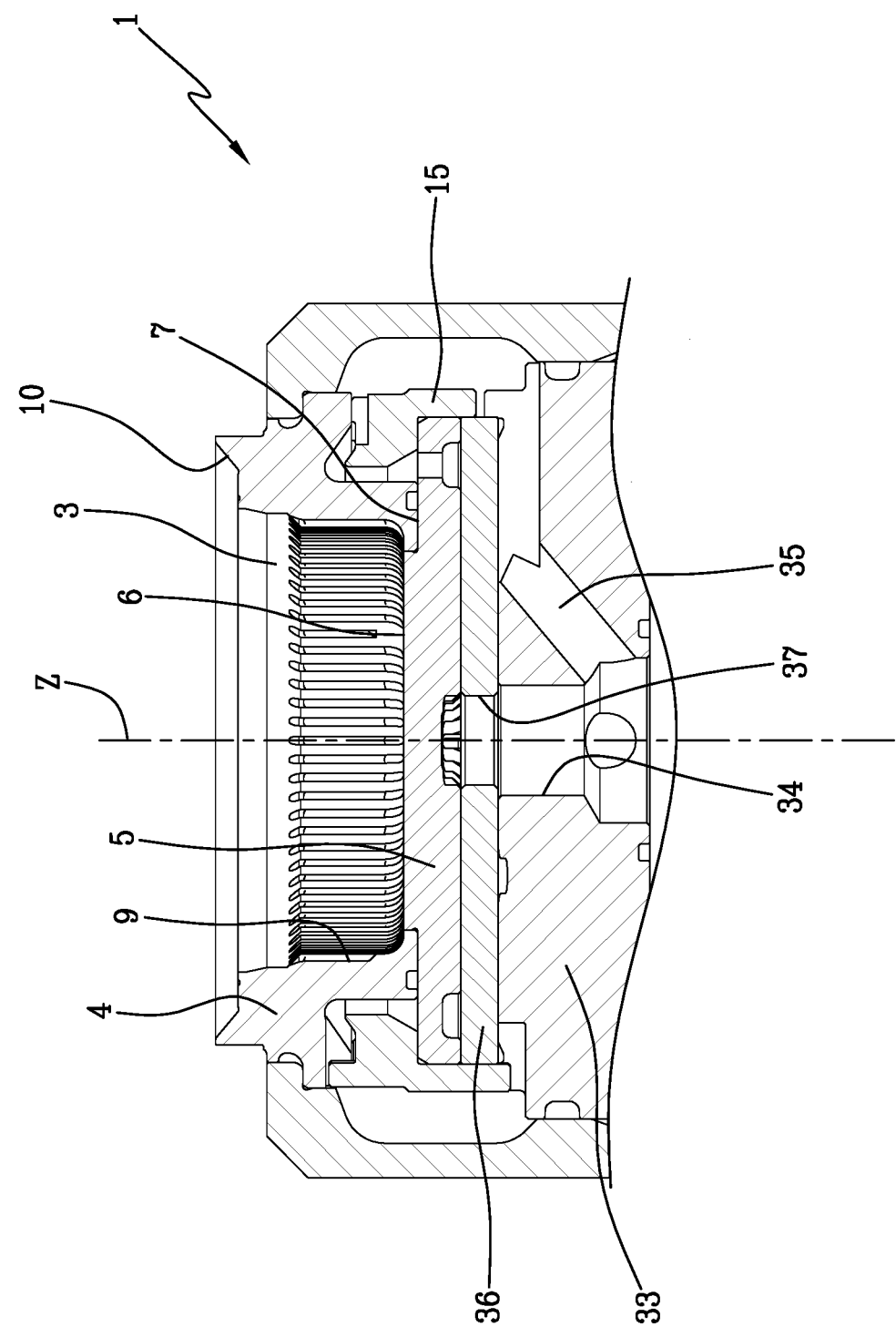
FIG. 1 is an interrupted cross section taken along an axial median plane of a female mould.
Figure 2:
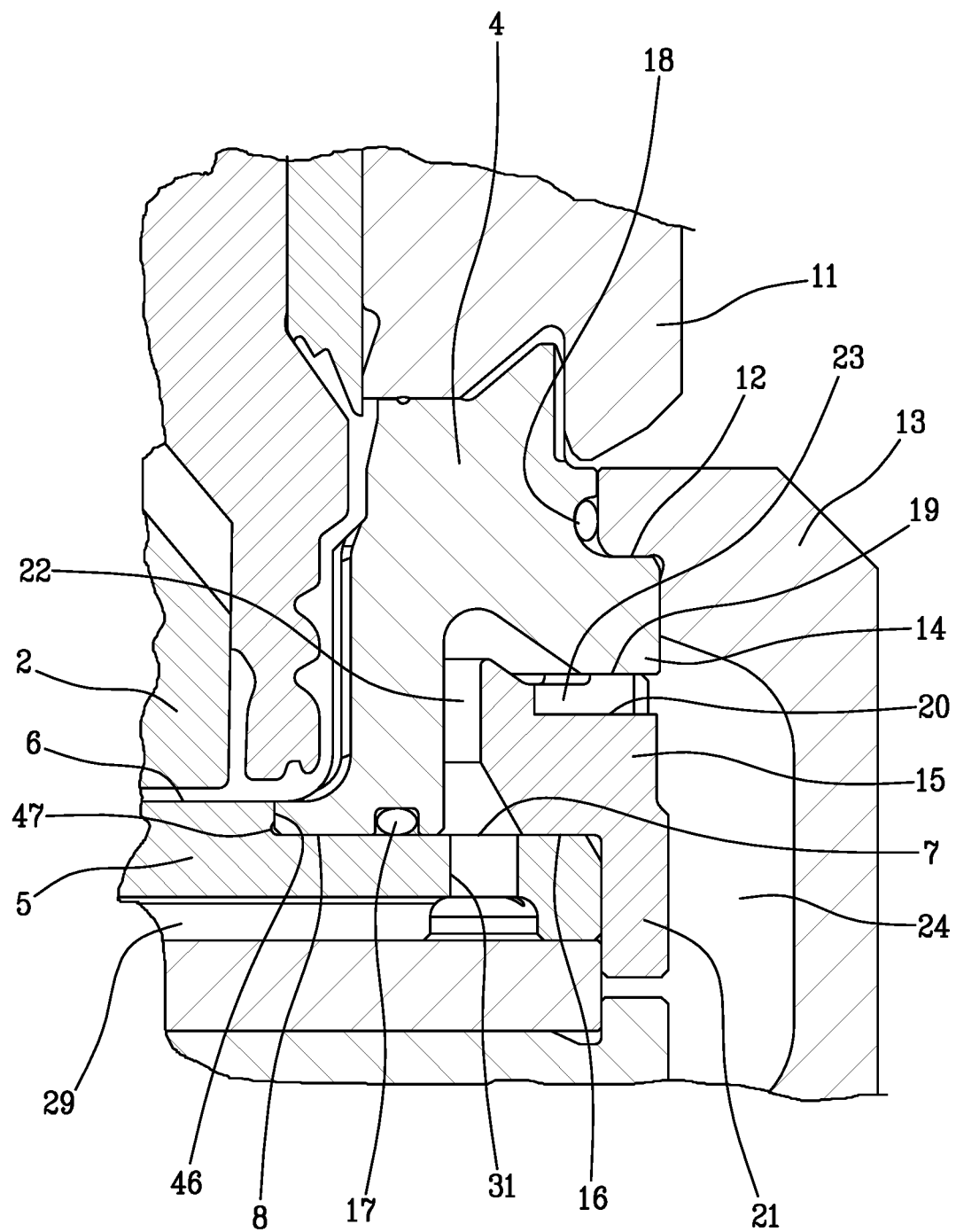
FIG. 2 shows, in section, an enlarged detail of the female mould of FIG. 1.

FIG. 1 shows a female mould 1 that is suitable for cooperating with a male mould 2, a portion of which is shown in FIG. 2, in order to form a concave object by molding a polymeric material. The concave object formed by the female mould 1 may be a cap for a container, in particular but not exclusively for a bottle. The female mould 1 is particularly suitable for obtaining the concave object by compression moulding.

The female mould 1 is provided with a forming cavity 3 inside of which the polymeric material can be shaped for obtaining the concave object.

The female mould 1 comprises an annular forming element 4 which extends about an axis Z in order to delimit the forming cavity 3 laterally, i.e. about the axis Z.

The female mould 1 further comprises a plate element 5 which delimits the forming cavity 3 transversely to the axis Z, in particular perpendicularly to the axis Z. The plate element 5 has an axis which coincides with the axis Z.

The plate element 5 is conformed as a single piece, in particular made of metal. In other words, the plate element 5 has a one-piece structure.

The plate element 5 has a forming surface 6 which extends transversely, in particular perpendicularly, to the axis Z and is suitable for contacting the polymeric material so as to shape the latter.

In the example shown in FIGS. 1 to 5, the forming surface 6 has a flat circular conformation, but this condition is not essential. The forming surface 6 defines a transverse surface, which in the example shown is a bottom surface, of the forming cavity 3. The forming surface 6 is suitable for externally shaping a transverse concave wall of the object that it is desired to form. If the concave object is a cap, the transverse wall formed by the forming surface 6 is a top wall of the cap, i.e. a wall which, in use, is arranged in an upper portion of the cap for closing an opening of a container.

The plate element 5 further has a reference surface 7 which extends transversely, in particular perpendicularly, to the axis Z, outside of the forming cavity 3. The reference surface 7 surrounds the forming surface 6.

The reference surface 7 is a flat surface, in particular shaped as a circular crown.

The forming surface 6 is formed on a protuberance 46 which protrudes from the reference surface 7 and delimits the protuberance 46 transversely, in particular perpendicularly, to the axis Z.

The annular forming element 4 is delimited, transversely to the axis Z, by a contact surface 8, shown in FIG. 2, which is suitable for contacting the reference surface 7. The contact surface 8 may be a flat surface arranged perpendicularly to the axis Z. In the example shown, the contact surface 8 inferiorly delimits the annular forming element 4.

The annular forming element 4 is delimited, in an inner portion thereof, by a shaping surface 9 suitable for interacting with the polymeric material to be moulded in order to externally shape a lateral wall of the concave object that it is desired to form.

If the concave object that it is desired to form is a cap, the shaped lateral wall of the shaping surface 9 may be externally provided with a plurality of knurls for promoting gripping of the cap by a user or a capping machine. The lateral wall mentioned above may be provided internally with one or more fastening elements, for example threaded portions, in order to fasten the cap to the container. The fastening elements are in this case shaped by the male mould 2.

In the illustrated example, the shaping surface 9 is arranged for externally shaping the lateral wall of the concave object (the lateral wall being possibly provided with a tamper-evident ring if the concave object is a cap), as well as for externally shaping a joining zone in which the lateral wall is joined to the transverse wall of the concave object. The shaping surface 9 is therefore provided with a curved portion which is connected continuously with the forming surface 6 of the plate element 5.

In an assembled configuration of the female mould 1, the annular forming element 4 abuts against a first portion of the reference surface 7 of the plate element 5. This first portion is arranged in a position close to the protuberance delimited by the forming surface 6.

The annular forming element 4 is provided, on the side opposite the contact surface 8, with a centering member which in the example shown comprises a centering projection 10, particularly shaped as a circumferential projection. The centering member is suitable for cooperating with a centering component 11 of the male mould 2, so as to allow the female mould 1 to be positioned with respect to the male mould 2 in a centered manner relative to axis Z. To this end, the centering component 11 may be provided with a groove suitable for receiving the centering projection 10. If the centering member is not conformed as a centering projection 10, the centering component 11 does not have any groove, but is suitably shaped in order to match with the centering member used.

The annular forming element 4 comprises a blocking surface 12 arranged transversely, in particular perpendicularly, to the axis Z. During use, the blocking surface 12 faces the male mould 2.

The blocking surface 12 is suitable for engaging with a locking nut or blocking ring 13 so that the annular forming element 4 and the plate element 5 can be fixed to a support (not shown) of the female mould 1.

The blocking surface 12 is formed on a radially projecting portion 14 of the annular forming element 4, the radially projecting portion 14 projecting radially outwardly of the annular forming element 4.

A gasket 17 may be housed in a seat extending from the contact surface 8 inwards of the annular forming element 4. The gasket 17 helps to prevent any leakage of liquid between the plate element 5 and the annular forming element 4.

A further gasket 18 may be interposed between the annular forming element 4 and the blocking ring 13, in order to prevent leakages of liquid between these components.

On the plate element 5, at the base of the protuberance 46, there is provided a recessed zone, i.e. an annular zone 47, from which material was removed when the plate element 5 was manufactured. The annular zone 47 may have a venting function for venting air possibly present inside the forming cavity 3 during moulding. Indeed, any air which remained trapped between the female mould 1 and the male mould 2 while the polymeric material is being shaped, may escape from the forming cavity 3 by passing between the protuberance 46 and the annular forming element 4, and finally be received in the annular zone 47. In addition the annular zone 47 prevents any substances, such as grease or other, used for mounting the gasket 17 in its seat, from penetrating inside the forming cavity 3, which would result in contamination of the polymeric material contained in the forming cavity 3.

The female mould 1 comprises a peripheral annular component 15 that surrounds at least partially the annular forming element 4. In particular, in the example of FIGS. 1 to 4, the peripheral annular component 15 surrounds a lower portion of the annular forming element 4, i.e. a portion of the annular forming element 4 arranged near the plate element 5.

In the example shown in FIGS. 1 to 4, the peripheral annular component 15 is clamped, i.e. axially blocked, between the plate element 5 and the annular forming element 4. In particular, the peripheral annular component 15 is delimited by an abutment surface 16 suitable for abutting against the reference surface 7 of the plate element 5. The abutment surface 16 is arranged transversely, in particular perpendicularly, to the axis Z.

In an assembled configuration of the female mould 1, the abutment surface 16 is in contact with a second portion of the reference surface 7, the second portion being arranged in a peripheral position with respect to the first portion of the reference surface 7, against which the annular forming element 4 abuts.

The peripheral annular component 15 is further delimited by a resting surface 19, on which the annular forming element 4 may rest, in particular on which the radially projecting portion 14 of the annular forming element 4 may rest. One or more indentations 20 are provided on the resting surface 19. At the indentations 20 the peripheral annular component 15 is spaced from the annular forming element 4.

The peripheral annular component 15 further comprises an appendage 21, protruding towards the plate element 5 and surrounding the plate element 5. The appendage 21 may be used to angularly orient the peripheral annular component 15 with respect to the plate element 5.

The peripheral annular component 15 surrounds a portion of the annular forming element 4, said portion having an outer diameter which is smaller than the inner diameter of the peripheral annular component 15. Thus, an annular interspace 22 is defined between the peripheral annular component 15 and the annular forming element 4, the annular interspace 22 extending axially. A cooling fluid may circulate inside the annular interspace 22.

The annular interspace 22 is in fluid communication with one or more transverse passages 23 defined at the interface between the annular forming element 4 and the peripheral annular component 15. The transverse passages 23 are at least partially defined inside the indentations 20.

The transverse passages 23 are in turn in fluid communication with a return space 24 delimited by the blocking ring 13 externally of the peripheral annular component 15.

Figure 3:
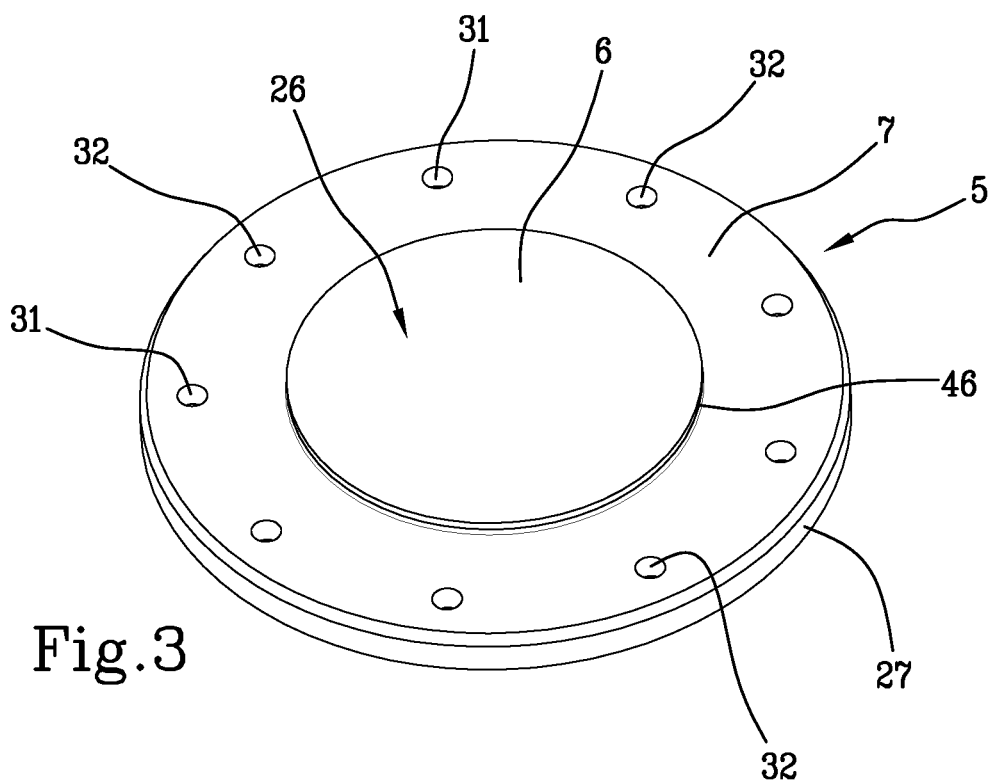
FIG. 3 is a perspective view, taken from above, of a plate element of the female mould of FIG. 1.
Figure 4:
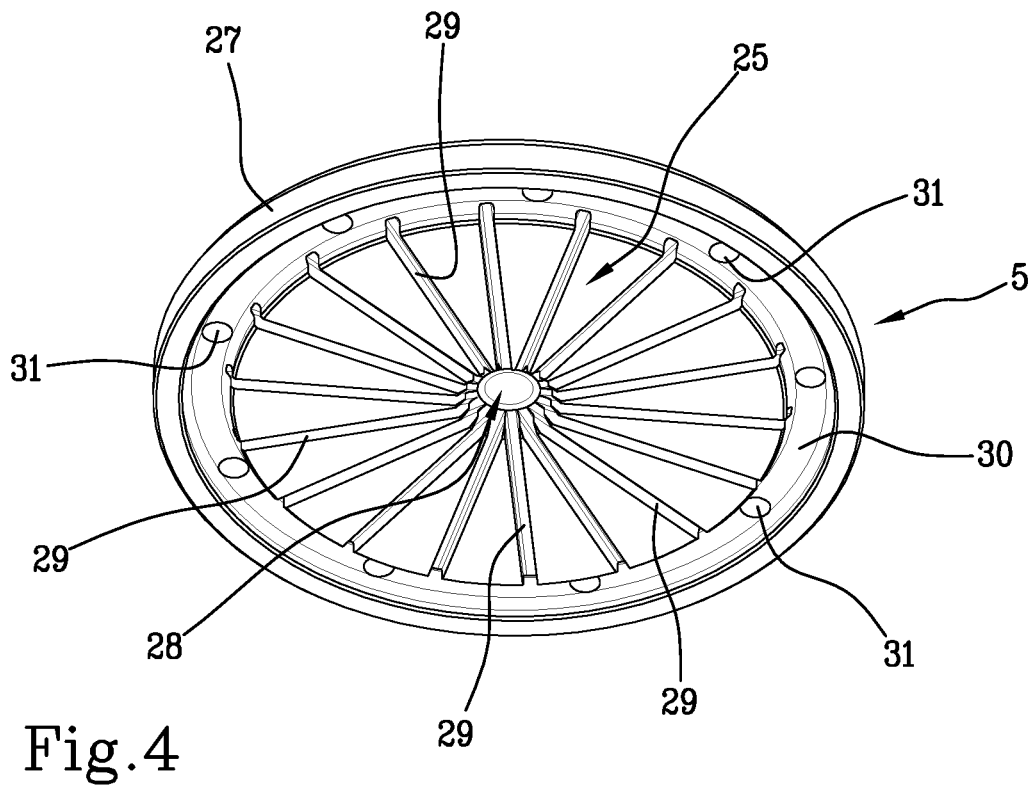
FIG. 4 is a perspective view, taken from below, of the plate element of FIG. 3.

As shown in FIGS. 3 and 4, the plate element 5 is delimited by a face 25, which in the example shown is a lower face, suitable for resting on a base of the female mould 1. The plate element 5 is further delimited by a further face 26, opposite the face 25, on which the forming surface 6 is provided.

On the further face 26 the reference surface 7 is further provided.

A lateral surface 27, which extends about the axis Z, laterally delimits the plate element 5 and connects the face 25 with the further face 26. The lateral surface 27 can in particular have a cylindrical shape.

In a central zone of the face 25 there is provided an inlet 28 for a cooling fluid, the cooling fluid being suitable for thermally conditioning the female mould.

The inlet 28 may be shaped as a blind cavity suitable for receiving the cooling fluid from a component of the female mould adjacent to the plate element 5.

The inlet 28 is in fluid communication with a plurality of cooling channels 29, which are formed on the face 25. The cooling channels 29 extend radially from the inlet 28 towards the periphery of the plate element 5. In the example illustrated, the cooling channels 29 are angularly equidistant from one another.

The cooling channels 29 open into an annular channel 30 which is provided on the face 25 of the plate element 5.

The plate element 5 further comprises a plurality of holes 31 that lead to respective outlets 32 arranged on the further face 26 of the plate element 4. The outlets 32 are distributed around the forming surface 6 and in particular are angularly equidistant one from another.

The outlets 32 are positioned in particular on the reference surface 7.

In the example shown, each hole 31 extends parallel to the axis Z. The holes 31 may be equally spaced about the axis Z.

The cooling channels 29, the annular channel 30 and the holes 31 define a plurality of cooling conduits by means of which a cooling fluid may pass through the plate element 5 in order to cool the female mould 1.

As shown in FIG. 1, the female mould 1 may further comprise a base element 33 suitable for being fixed to a support of a moulding apparatus. In particular, the base element 33 may be fastened to a stem (not shown) of an actuator, the actuator being arranged for moving the female mould 1 with respect to the male mould 2 along the axis Z.

The base element 33 is provided with an inlet conduit 34, which may be arranged along the axis Z. Through the inlet conduit 34 a cooling fluid may flow into the female mould 1 for being directed towards the forming cavity 3. The base element 33 is further provided with an outlet conduit 35 to allow the cooling fluid to flow out from the female mould 1 after cooling the forming cavity 3.

The female mould 1 may comprise a spacer 36 interposed between the plate element 5 and the base element 33. The spacer 36 is provided with a passage hole 37 arranged in a central zone, so that the inlet conduit 34 is put in fluid communication with the inlet 28 provided on the plate element 5.

In order to assemble the female mould 1, the spacer 36, if provided, is placed on the base element 33. The base element 33 and the spacer 36 define a base of the female mould 1, on which the plate element 5 rests.

On the second portion or outer portion of the reference surface 7, the peripheral annular component 15 is placed. Subsequently, on the first portion or inner portion of the reference surface 7, the annular forming element 4 is placed. At this point the blocking ring 13 is mounted, the blocking ring 13 being locked on a support of the female mould 1 so that the annular forming element 4 is pushed against the plate element 5. The annular forming element 4, pushed by the blocking ring 13, acts in turn on the peripheral annular component 15, by pressing the latter against the plate element 5. In this manner, the annular forming element 4, the plate element 5 and the peripheral annular component 15 are fixed to the support of the female mould 1.

When the female mould 1 is in an assembled configuration, the radially projecting portion 14 of the annular forming element 4 is limited in its deformation due to contact with the resting surface 19 of the peripheral annular component 15. This prevents the radially projecting portion 14 from bending downwards, i.e. towards the plate element 5.

Excessive deformation of the annular forming element 4, and in particular of the centering projection 10, is thereby prevented. This ensures that a good accuracy is maintained when centering the female mould 1 with respect to the male mould 2.

Additionally, if the blocking ring 13 is erroneously excessively screwed, the forces—even very high forces—applied by the blocking ring 13 to the radially projecting portion 14 discharge on the peripheral annular component 15, on the plate element 5 and from here, on the support of the female mould 1, which prevents any breakages of the annular forming element 4.

During operation, the female mould 1 is cooled by sending a cooling fluid, for example water, inside the inlet conduit 34 of the base element 33. From here, the cooling fluid reaches the inlet 28 provided on the plate element 5 by passing through the passage hole 37 of the spacer 36. The cooling fluid, entered from the inlet 28, flows out on the further face 26 by passing through the cooling conduits of the plate element 5. The cooling fluid particularly flows through the cooling channels 29, which are closed inferiorly by the spacer 36 and passes into the annular channel 30. From here, the cooling fluid reaches the outlets 32 by flowing through the holes 31.

The forming surface 6 is thus cooled.

From the outlets 32, the cooling fluid passes into the annular interspace 22, from which it flows out into the transverse passages 23 and reaches the return space 24. The latter is in fluid communication with the outlet conduit 35 formed in the base element 33, so that the cooling fluid can flow away from the female mould 1.

When flowing in the annular interspace 22, the cooling fluid cools the shaping surface 9 which laterally delimits the forming cavity 3. Because the radially projecting portion 14 of the forming annular element 4 may rest on the resting surface 19, thus being subject to reduced deformation risks, it is possible to reduce thickness in the axial direction of the radially projecting portion 14, so that the annular interspace 22 extends in an axial portion as great as possible of the forming cavity 3. In other words, the transverse passages 23 may be arranged in a position which is closer to the centering projection 10 if compared with traditional female moulds. This allows to increase cooling efficiency, since also the zones of the concave object which are farthest from the plate element 5 can be effectively cooled.

FIGS. 5 to 8 show a female mould 101 according to an alternative embodiment. The parts of the female mould 101 common to the parts of the female mould 1 shall be referred to with same reference numbers already used in FIGS. 1 to 4 and will not be described further in detail.

Figure 5:
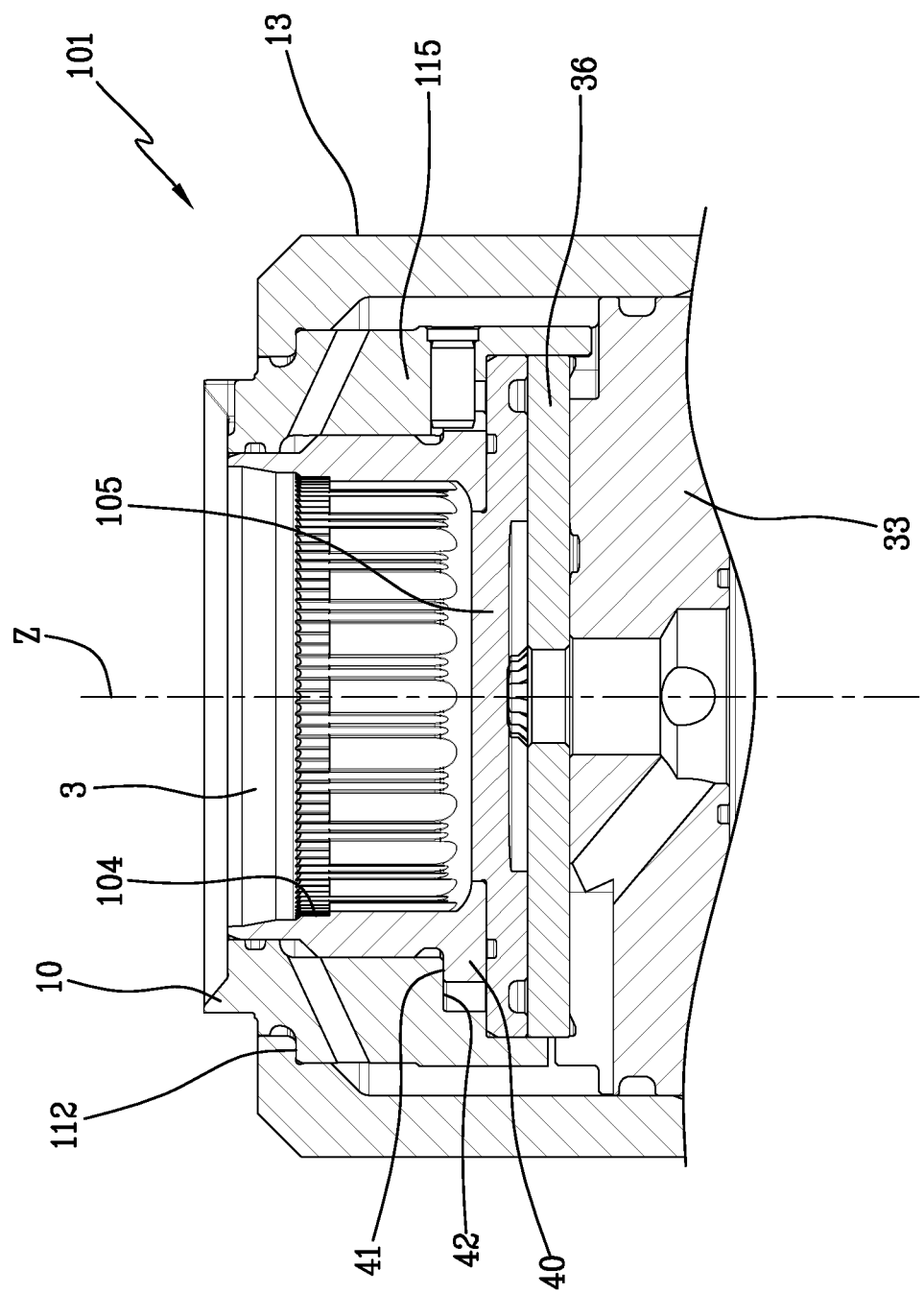
FIG. 5 is an interrupted cross section like that of FIG. 1, showing a female mould according to an alternative embodiment.
Figure 6:
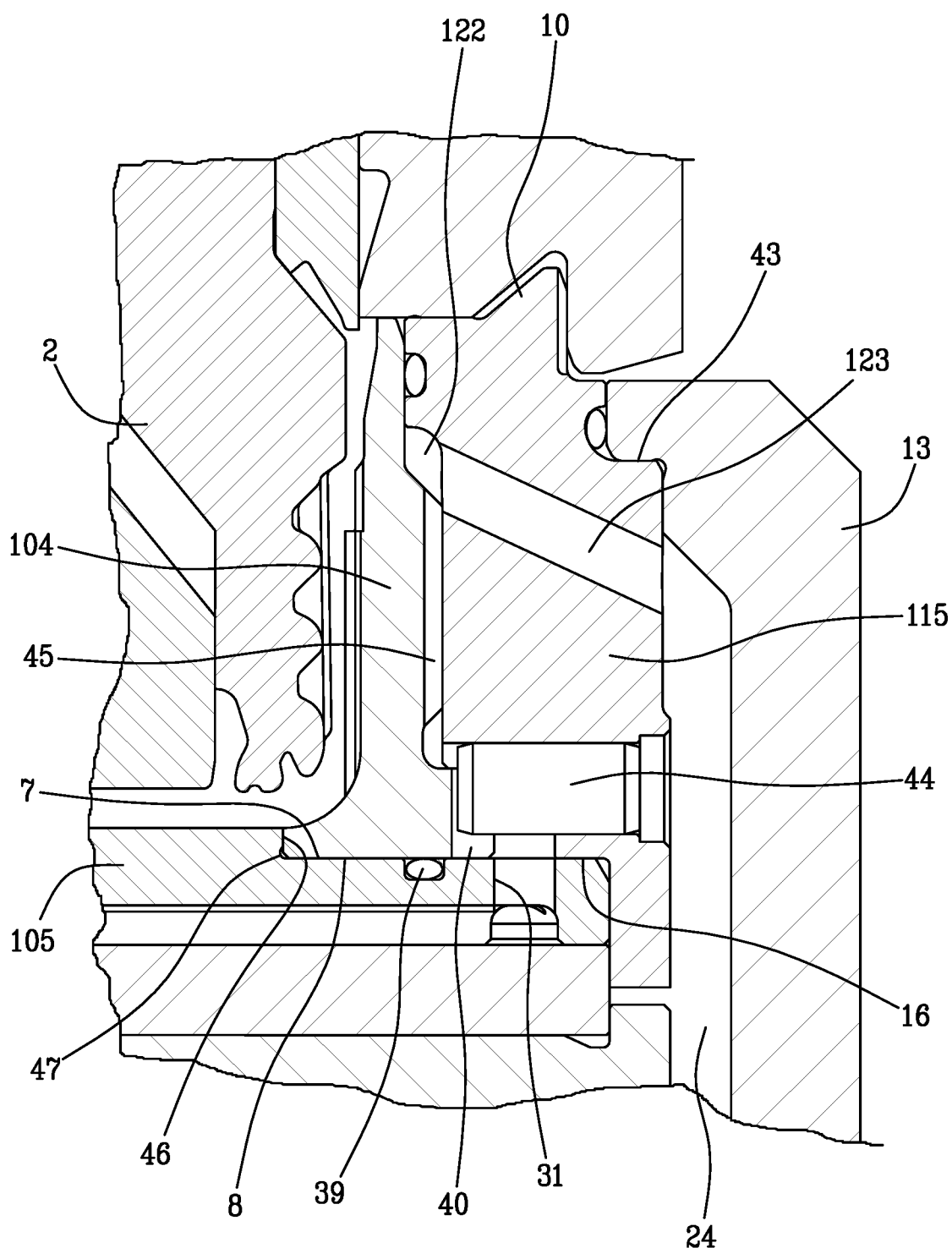
FIG. 6 shows, in section, an enlarged detail of the plate element of the female mould of FIG. 5.

The female mould 101 comprises a plate element 105, an annular forming element 104 and a peripheral annular component 115. Unlike to what occurred in the embodiment of FIGS. 1 to 4, the annular forming element 104 shown in FIGS. 5 and 6 is partially interposed between the peripheral annular component 115 and the plate element 105. In particular, the annular forming element 104 is provided with a lateral appendage 40, shown in FIG. 5, which is protruding outwardly from a zone of the annular forming element 104 arranged in contact with the plate element 105. The lateral appendage 40 extends circumferentially about the axis Z.

The abutment surface 16 is provided in a portion of the peripheral annular component 115 facing the plate element 105. As previously described with reference to the embodiment of FIGS. 1 to 4, the abutment surface 16 is, in use, arranged in contact with the reference surface 7 of the plate element 105. Internally of the peripheral annular component 115, a step is further provided, the step being delimited by a transverse surface 42.

The lateral appendage 40 is delimited at the top thereof, i.e. on the farthest side from the plate element 105, by a stop surface 41 against which, in an assembled configuration of the female mould 101, the transverse surface 42 abuts.

In the example illustrated, the peripheral annular component 115 has an axial dimension, i.e. a dimension along the axis Z, which is equal to or greater than the axial dimension of the annular forming element 104. Thus, the peripheral annular component 115 may surround the annular forming element 104 along the entire axial extension of the annular forming element 104. In an embodiment that is not shown, the axial dimension of the peripheral annular component 115 may be less than the axial dimension of the annular forming element 104.

The peripheral annular component 115 is provided, in a region thereof facing the male mould 2, with a shoulder 43 delimited by a blocking surface 112 against which the blocking ring 13 may engage.

A plurality of transverse passages 123 are formed through the thickness of the peripheral annular component 115 in a position close to the shoulder 43. In the example shown, the transverse passages 123 are shaped as through holes extending through the thickness of the peripheral annular component 115. The transverse passages 123 may be arranged obliquely with respect to the axis Z. When displacing from the inside towards the outside, the transverse passages 123 may be oriented from the top downwards, i.e. towards the plate element 105. The transverse passages 123 put in fluid communication an annular conduit 122, defined between the peripheral annular component 115 and the annular forming element 104, with the return space 24 defined between the blocking ring 13 and the peripheral annular component 115.

On an outer surface of the annular forming element 104 a plurality of grooves is formed. These grooves define, together with an inner surface of the peripheral annular component 115, corresponding longitudinal conduits 45 through which the cooling fluid may flow. The longitudinal conduits 45 open into the annular conduit 122.

The longitudinal conduits 45 are in fluid communication with the holes 31 of the plate element 105 through suitable passage conduits, defined between the peripheral annular component 115 and the annular forming element 104.

The centering member for centering the female mould 101 with respect to the male mould 2, is provided on the peripheral annular component 115. This centering member may comprise the centering projection 10.

In addition to, or in place of, the centering projection 10, the centering member may comprise an angular timing protuberance that is not shown. The angular timing protrusion may be for example tooth-shaped and may be formed on the peripheral annular component 115 and projecting from a lower edge of the latter, in order to engage in a corresponding recess provided in the base element 33.

Finally, the peripheral annular component 115 may be provided with a hole in which a pin 44 may be inserted, the pin 44 being suitable for engaging in a recess of the annular forming element 104. This ensures that the peripheral annular component 115 is mounted in a predefined angular position with respect to the annular forming element 104.

Figure 7:
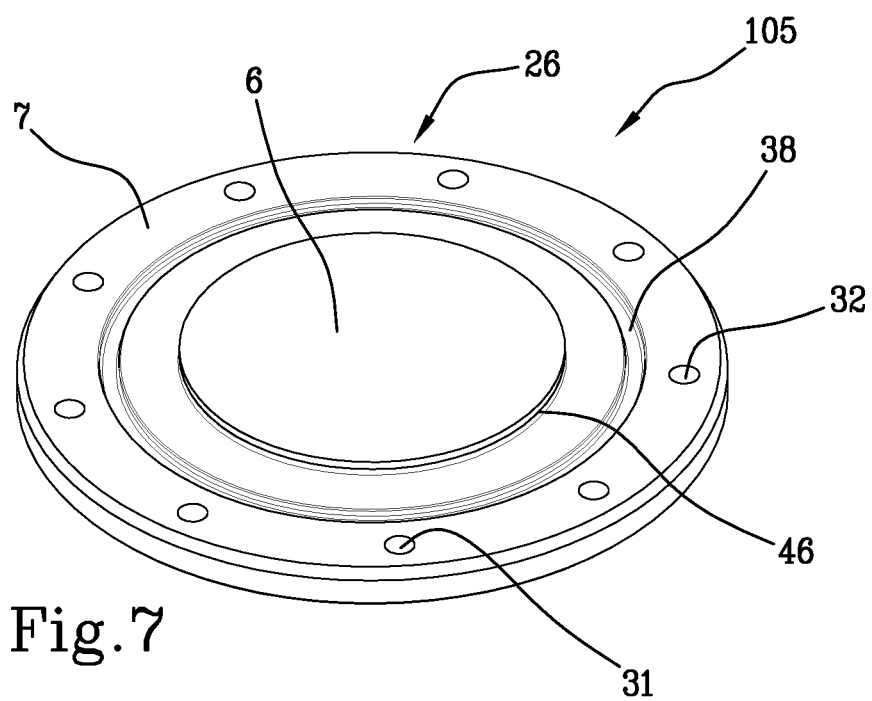
FIG. 7 is a perspective view, taken from above, of a plate element of the female mould of FIG. 5.
Figure 8:
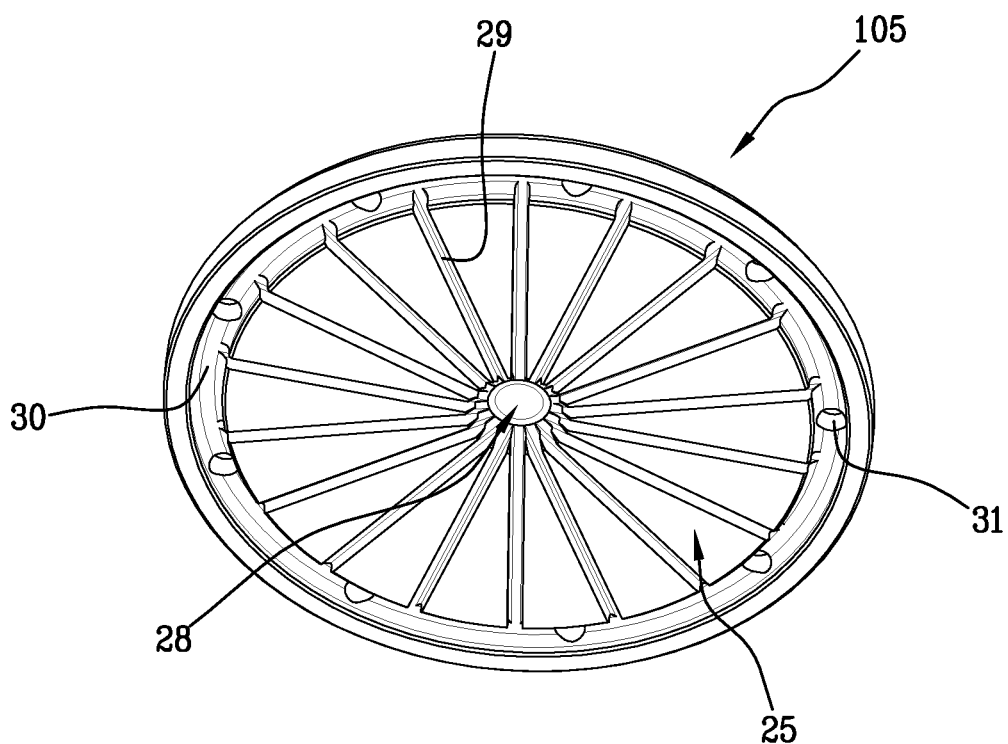
FIG. 8 is a perspective view, taken from below, of the plate element of FIG. 5.

The plate element 105 is shown in detail in FIGS. 7 and 8. The plate element 105 is structurally and functionally entirely similar to the plate element 5 shown in FIGS. 1 to 4. The plate element 105 differs from the plate element 5 mainly because a groove 38 is provided on its further face 26. The groove 38, which may be particularly a circular-shaped groove, is suitable for housing a sealing gasket 39, shown in FIG. 5. The sealing gasket 39 prevents any substantial leakage of liquid between the plate element 105 and the annular forming element 104.

In an assembled configuration, the plate element 105 is supported by the base element 33, with possible interposition of the spacer 36.

On the plate element 105, the annular forming element 104 rests. In particular, the contact surface 8 of the annular forming element 104 abuts against the first portion or inner portion of the reference surface 7 which delimits the plate element 105. The plate element 105 and the annular forming element 104 delimit the forming cavity 3.

The blocking ring 13 engages with the peripheral annular component 115 in order to lock the latter on the support of the female mould 1. In particular, the blocking ring 13 abuts against the blocking surface 112 delimiting the shoulder 43. The blocking ring 13 pushes the peripheral annular component 115 in abutment against the plate element 105. In particular, the abutment surface 16 is put in contact with the second portion, or outer portion, of the reference surface 7. Furthermore, the transverse surface 42 of the peripheral annular component 115 faces the stop surface 41 of the annular forming element 104, so that the latter is retained between the plate element 105 and the peripheral annular component 115.

Also in this embodiment, the forming surface 6 delimits the protuberance 46 of the plate element 105. At the base of the protuberance 46 there is provided the recessed zone or annular zone 47 which is conformed as a depression. The annular zone 47 may perform venting functions for venting air possibly present inside the forming cavity 3 during moulding. Furthermore, the annular zone 47 may block passage of any substances used for mounting the gasket 39, such as grease or the like, thus preventing such substances from flowing back towards the forming cavity 3 and contaminating the content thereof.

During operation of the female mould 101, the cooling fluid reaches the inlet 28 provided on the plate element 104, as previously described with reference to FIGS. 1 to 4. From here, by passing through the cooling conduits defined by the cooling channels 29, by the annular channel 30 and by the holes 31, the cooling fluid reaches the annular forming element 104. The cooling fluid passes through the longitudinal conduits 45 for laterally cooling the forming cavity 3 and then, by flowing through the annular conduit 122, the transverse passages 123 and the return space 24, the cooling fluid flows out from the female mould 101.

The female mould 101 allows to achieve the advantages previously discussed with reference to the embodiment shown in FIGS. 1 to 4. In addition, the female mould allows the forming cavity 3 to be cooled in an improved manner, and in particular improves cooling of the surface which delimits laterally the forming cavity 3, also near the male mould 2.

This is mainly due to the fact that, in the embodiment shown in FIGS. 5 to 8, the annular forming element 104 has a single predominant function, namely the function of shaping the concave object that is moulded in the forming cavity 3. However, the annular forming element 104 does not have any supporting or blocking functions in relation to other elements of the female mould 101. The thickness of the annular forming element 104 can therefore be significantly reduced if compared to the embodiment shown in FIGS. 1 to 4. Consequently, the cooling fluid may be brought very close to the forming cavity 3, so as to effectively cool the object formed inside the forming cavity 3.

In addition, the annular conduit 122 into which the longitudinal conduits 45 open, may be arranged in a position close to an upper end of the annular forming element 104, so that the zones of the forming cavity 3 arranged near the male mould 2 can be also cooled.

Figure 9:
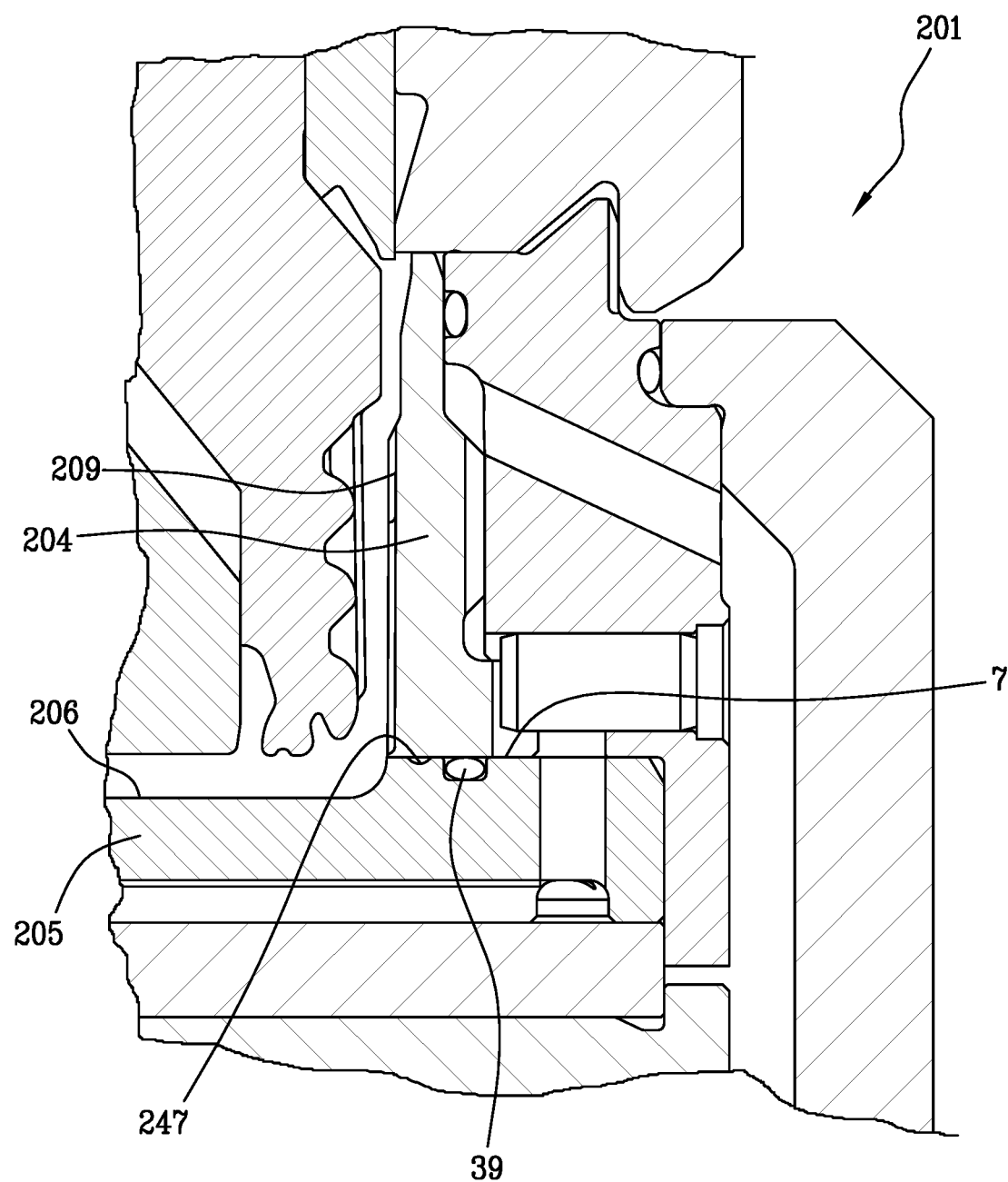
FIG. 9 shows, in section, an enlarged detail of a female mould according to an alternative embodiment.
Figure 10:
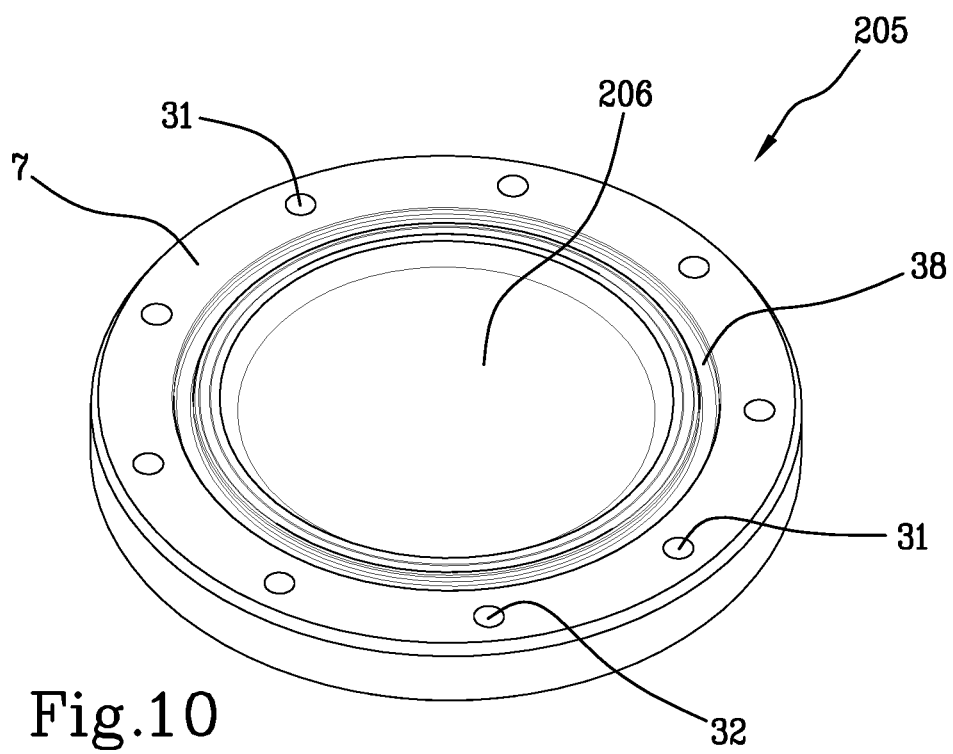
FIG. 10 is a perspective view, taken from above, of a plate element of the female mould of FIG. 9.
Figure 11:
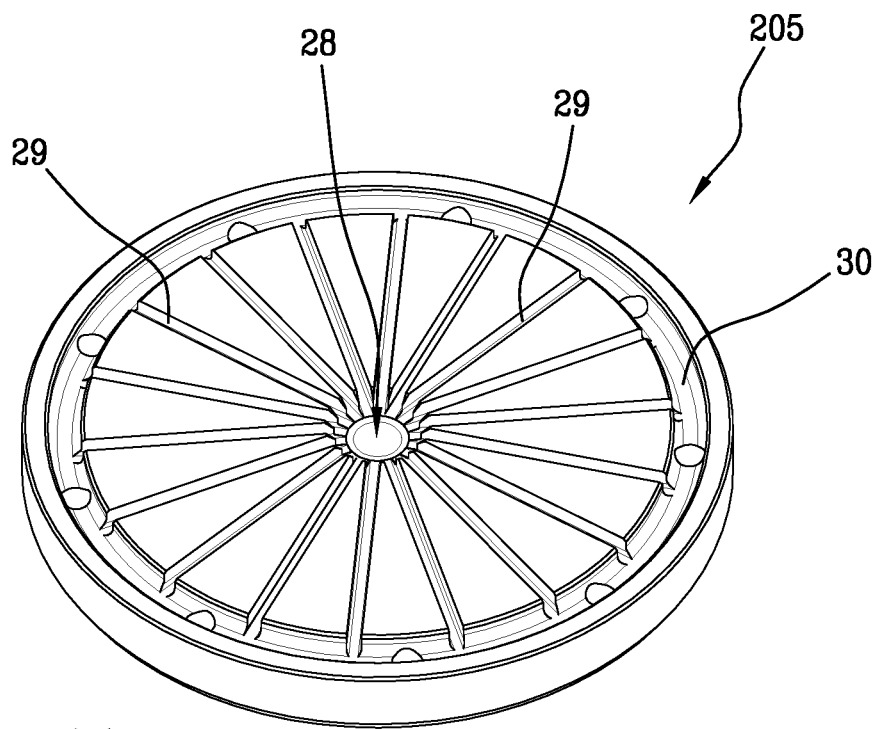
FIG. 11 is a perspective view of the plate element of FIG. 10, which is rotated such that a lower face thereof is shown.

FIGS. 9 to 11 show a female mould 201 according to a further alternative embodiment, similar to the female mould 101 shown in FIGS. 5 to 8, from which the female mould 201 differs mainly for the conformation of the forming surface and the shaping surface, which are provided on the plate element and on the annular forming element respectively.

In particular, the female mould 201 comprises an annular forming element 204 provided with a shaping surface 209 which is configured to shape externally a side wall (possibly provided with a tamper-evident ring) of the concave object formed inside the forming cavity 3. The female mould 201 further comprises a plate element 205 provided with a forming surface 206, which is configured to externally shape not only a transverse wall of the concave object, but also a joining zone for joining the transverse wall and the lateral wall.

In the embodiments shown in FIGS. 1 to 8, the lateral wall of the concave object, as well as the joining zone for joining the lateral wall and the transverse wall, were instead both shaped externally by the annular forming element, whereas the plate element was intended to externally shape only the transverse wall of the concave object.

Accordingly, the forming surface 206 comprises a substantially flat central part, which is suitable for shaping the transverse wall, the central part being surrounded by a curved connection portion, which is suitable for shaping the joining zone for joining the lateral wall and the transverse wall of the concave object.

The moulding surface 206 delimits a recess which penetrates into the thickness of the plate element 205.

The reference surface 7 surrounds the forming surface 206. On the reference surface 7 the groove 38 may be formed, the groove 38 being intended to house the sealing gasket 39.

A recessed annular zone 247, also shaped as a groove, may be provided on the reference surface 7. The annular zone 247 is arranged in a concentric position relative to the groove 38 and is closer to the forming surface 206 than the groove 38. The annular zone 247 acts as a vent for any air trapped inside the forming cavity 3 during moulding. Furthermore, owing to the annular zone 247, any grease or other similar substances used to mount the gasket 39, are prevented from reaching the forming cavity 3.

The female mould 201 is assembled and operates in a similar way to that previously described with reference to FIGS. 5 to 8. In addition, the female mould 201 allows to obtain the advantages already disclosed with reference to the embodiments of the mould that have been previously disclosed.

The invention claimed is:

1. A female mould for forming a concave object, the concave object having an inner surface which delimits a concavity of the concave object and an outer surface which delimits the concave object at a side thereof opposite the concavity, the female mould having a forming cavity for forming the outer surface of the concave object, the female mould comprising:

an annular forming element extending about an axis and delimiting the forming cavity about said axis, the annular forming element having a shaping surface for externally shaping at least a lateral wall of the concave object;

a plate element which delimits the forming cavity transversely to said axis, the plate element having a reference surface extending transversely to said axis outside the forming cavity, the plate element further having a forming surface for externally shaping at least a transverse wall of the concave object;

a peripheral annular component at least partially surrounding the annular forming element, wherein the annular forming element abuts against a first portion of the reference surface of the plate element, and wherein the peripheral annular component abuts against a second portion of the reference surface of the plate element, the female mould further comprising a blocking ring extending around the peripheral annular component, the peripheral annular component being fastened against the plate element by the blocking ring.

2. A female mould according to claim 1, wherein the plate element is delimited by a face and by a further face opposite said face, the forming surface being provided on said further face, the reference surface being provided on said further face.

3. A female mould according to claim 2, wherein the plate element is delimited by a lateral surface which extends about said axis and connects said face with said further face.

4. A female mould according to claim 2, wherein the reference surface is conformed as a circular crown that surrounds the forming surface.

5. A female mould according to claim 1, wherein the reference surface is a flat surface.

6. A female mould according to claim 1, wherein the peripheral annular component is clamped between the annular forming element and the plate element, so that the annular forming element pushes the peripheral annular component towards the plate element.

7. A female mould according to claim 6, wherein the peripheral annular component surrounds a portion of the annular forming element which is adjacent to the plate element, the peripheral annular component being axially delimited by an abutment surface and a support surface opposite to one another, said abutment surface being in contact with the second portion of said reference surface, the annular forming element having a radially projecting portion which rests on said support surface.

8. A female mould according to claim 6, wherein the annular forming element comprises a centering member for centering the female mould with respect to a male mould.

9. A female mould according to claim 6, wherein the blocking ring is suitable for pushing on a blocking surface in order to block the annular forming element and the peripheral annular component against the plate element, the blocking surface, on which the blocking ring acts, being located on the annular forming element.

10. A female mould according to claim 1, wherein the annular forming element has a portion interposed between the peripheral annular component and the plate element, so that the peripheral annular component prevents the annular forming element from being moved away from the plate element.

11. A female mould according to claim 10, wherein the peripheral annular component surrounds the annular forming element along the entire axial extension of the annular forming element.

12. A female mould according to claim 10, wherein the portion of the annular forming element interposed between the peripheral annular component and the plate element is a lateral appendage, which projects outwardly from a zone of the annular forming element arranged in contact with the plate element, the peripheral annular component having an inner step which abuts against the lateral appendage.

13. A female mould according to claim 10, wherein the peripheral annular component comprises a centering member for centering the female mould with respect to a male mould.

14. A female mould according to claim 10, wherein the blocking ring is suitable for pushing on a blocking surface in order to keep the annular forming element and the peripheral annular component in contact with the plate element, the blocking surface, on which the blocking ring acts, being located on the peripheral annular component and delimiting a shoulder of the peripheral annular component.

15. A female mould according to claim 1, wherein the plate element comprises:

an inlet for a cooling fluid, said inlet being located in a central zone of a face of the plate element, said face facing a base of the female mould, a plurality of outlets for the cooling fluid, the outlets of said plurality being located on a further face of the plate element, said further face being opposite said face and facing the forming cavity, a plurality of cooling conduits for connecting the inlet to the outlets of said plurality.

16. A female mould according to claim 15, wherein the cooling conduits of said plurality comprise a plurality of radial channels originating from said inlet, an annular channel in which the radial channels open and a plurality of holes passing through the thickness of the plate element so that the annular channel is connected to respective outlets of said plurality of outlets.

17. A female mould according to claim 15, wherein the peripheral annular component is clamped between the annular forming element and the plate element, so that the annular forming element pushes the peripheral annular component towards the plate element, and further comprising an annular interspace interposed between the annular forming element and the peripheral annular component, said annular interspace being in fluid communication with the outlets of the plate element, the female mould further comprising a plurality of transverse passages extending transversely to said axis, said transverse passages being defined between the annular forming element and the peripheral annular component, said transverse passages connecting the annular interspace with a return space surrounding the peripheral annular component for allowing the cooling fluid to move away from the forming cavity.

18. A female mould according to claim 15, wherein the annular forming element has a portion interposed between the peripheral annular component and the plate element, so that the peripheral annular component prevents the annular forming element from being moved away from the plate element, and further comprising a plurality of longitudinal conduits defined between the annular forming element and the peripheral annular component, said longitudinal conduits being in fluid communication with the outlets of the plate element and opening into an annular conduit, which is defined between the annular forming element and the peripheral annular component, the female mould further comprising a plurality of transverse passages extending transversely to said axis through the thickness of the peripheral annular component, said transverse passages connecting the annular conduit with a return space, the return space surrounding the peripheral annular component and allowing the cooling fluid to move away from the forming cavity.

19. A female mould according to claim 1, wherein the shaping surface of the annular forming element is further conformed for shaping a joining zone between the transverse wall and the lateral wall of said concave object and wherein the forming surface is defined on a protrusion of the plate element, said protrusion being surrounded by the reference surface.

20. A female mould according to claim 1, wherein the forming surface of the plate element is further conformed for shaping a joining zone between the transverse wall and the lateral wall of said concave object and wherein the forming surface delimits a recess penetrating through the thickness of the plate element, said recess being surrounded by the reference surface.

21. A female mould according to claim 1, wherein the annular forming element has an end which has a surface which abuts against the first portion of the reference surface of the plate element.

22. A female mould for forming a concave object, the concave object having an inner surface which delimits a concavity of the concave object and an outer surface which delimits the concave object at a side thereof opposite the concavity, the female mould having a forming cavity for forming the outer surface of the concave object, the female mould comprising:
   an annular forming element extending about an axis and delimiting the forming cavity about said axis, the annular forming element having a shaping surface for externally shaping at least a lateral wall of the concave object;
   a plate element which delimits the forming cavity transversely to said axis, the plate element having a reference surface extending transversely to said axis outside the forming cavity, the plate element further having a forming surface for externally shaping at least a transverse wall of the concave object;
   a peripheral annular component at least partially surrounding the annular forming element,
wherein the annular forming element abuts against a first portion of the reference surface of the plate element,
and wherein the peripheral annular component abuts against a second portion of the reference surface of the plate element,
the plate element comprising:
   an inlet for a cooling fluid, said inlet being located in a central zone of a face of the plate element, said face facing a base of the female mould,
   a plurality of outlets for the cooling fluid, the outlets of said plurality being located on a further face of the plate element, said further face being opposite said face and facing the forming cavity,
   a plurality of cooling conduits for connecting the inlet to the outlets of said plurality, wherein the annular forming element has a portion interposed between the peripheral annular component and the plate element, so that the peripheral annular component prevents the annular forming element from being moved away from the plate element, and further comprising a plurality of longitudinal conduits defined between the annular forming element and the peripheral annular component, said longitudinal conduits being in fluid communication with the outlets of the plate element and opening into an annular conduit, which is defined between the annular forming element and the peripheral annular component, the female mould further comprising a plurality of transverse passages extending transversely to said axis through the thickness of the peripheral annular component, said transverse passages connecting the annular conduit with a return space, the return space surrounding the peripheral annular component and allowing the cooling fluid to move away from the forming cavity.

* * * * *